Patented Feb. 7, 1939

2,146,276

UNITED STATES PATENT OFFICE 2,146,276

TREATMENT OF RESINS

George H. Wilder, Arlington, N. J., assignor, by mesne assignments, to E. I. du Pont de Nemours & Company, Wilmington, Del., a corporation of Delaware No Drawing. Application June 5, 1936, Serial No. 83,715

8 Claims. (Cl. 260—2)

This invention relates to the olefine-sulphone resins and, more particularly, to a process of treating them so as to reduce or eliminate their tendency to be deteriorated and decomposed by heat.

The olefine-sulphone resins, made by the interaction of individual olefines, or mixtures of olefines, with sulfur dioxide, have certain commercial advantages such as cheapness, good appearance, and ready workability by established techniques. As heretofore made, however, they have been seriously handicapped because of a tendency to decompose when heated, particularly when such heating is done in the absence of positive pressure. The decomposition of the resin is evidenced by a foaming and opacification, and there is a gradual conversion of the initial thermoplastic resin into a non-thermoplastic modification which is of little value because of lack of strength and because of susceptibility to the action of water, alkalies, and acids. This has been a serious drawback and has practically excluded resins of this type from successful use in injection molding, for which these resins are otherwise well adapted. In injection molding, the exposure of the resins to high temperature is ordinarily longer than in the compression molding process and the temperatures obtaining are likely to be higher also.

An object of the present invention is to provide an economical and practical process of treating olefine-sulphone resins so as to reduce or eliminate their susceptibility to decomposition by heat. A further object is to provide stabilized olefine-sulphone resins adapted to be injection molded without decomposition. Other objects of the invention will be apparent from the description given hereinafter.

The above objects are accomplished according to the present invention by treating olefine-sulphone resins with a compound having an olefinic bond and selected from the group consisting of vinyl acetate, partially polymerized vinyl chloride, esters of acrylic and methacrylic acids, courmarin, furfural, and chloroprene.

It has been discovered that the olefine-sulphone resins are subject to decomposition by heat due to the presence of uncombined residues of sulfur dioxide and that these residues of sulfur dioxide may readily be neutralized or eliminated, and their harmful effect thus overcome, by treating the resin after completion of the reaction whereby the resin is formed, with one, or a mixture of several of the compounds herein considered. This treatment may be carried out by introducing the treating compound into the reaction mixture in which the resin is formed, subsequent to formation of the resin, or the resin may be separated from the reaction mixture and the treating compound may be incorporated uniformly in it by kneading either in the presence or absence of solvent.

The general class of olefine-sulphone resins is well known and these resins are ordinarily made by reacting with sulfur dioxide one, or a mixture of several, of the following olefines:

Propylene
Butene 1
Butene 2
Pentene 1

The following examples, in which all parts are given by weight, illustrate specific embodiments of the invention:

*Example 1.*—An olefine-sulphone resin made by the interaction of a mixture of butene 1 and butene 2 and sulfur dioxide by known procedure and commercially available in the form of more or less finely divided granules, is objectionably subject to decomposition by heat in the manner described above. It is stabilized by the following procedure:

To 19 parts of this resin, in a masticator mixer, is added 1 part of methyl methacrylate monomer. The mixing is continued for about 5 minutes which is adequate to effect a thorough incorporation of the liquid monomer into the resin. The temperature during mixing ranges from 60–100° C. The resulting homogeneous mass is then cut up and comminuted to give a granular molding powder. This powder is not visibly decomposed upon being injection molded, involving an exposure for some minutes to temperatures of the order of 220–250° C.

*Example 2.*—One part of methyl methacrylate monomer is added directly to 19 parts of a resin made by the interaction of a mixture of butene 1 and butene 2, and sulfur dioxide, in the reaction kettle at the close of the reaction of formation of the resin. Agitation is continued for from 5–10 minutes. The relatively hot mass is then run out of the reaction kettle, cooled and reduced to granular form.

*Example 3.*—Twenty parts of a butene 1-sulfur dioxide resin are treated with 1 part of monomeric glycol dimethacrylate, the two being kneaded together in a masticator mixer until the mixture is homogeneous and plastic. This kneading elevates the temperature somewhat but not in excess of 100° C. The resulting treated resin is then cut up and comminuted to give a molding powder which is heat stable in the course of molding by the ordinary technique of either compression or injection molding.

*Example 4.*—The procedure of Example 2 is carried out except that immediately prior to the kneading of the neutralizing agent and the resin, 5 parts of acetone are added. The temperature prevailing during the kneading was about 60° C. The acetone is removed after the product has been reduced to granular form by a seasoning treatment at 70–80° C.

*Example 5.*—The procedure of Example 3 is carried out except that the resin used is one formed by the interaction of sulfur dioxide and pentene 1 and the neutralizing agent is butyl acrylate.

*Example 6.*—The procedure of Example 2 is carried out except that vinyl acetate monomer is used in place of methyl methacrylate monomer but in the same proportion.

*Example 7.*—The procedure of Example 2 is carried out with the variation that a mixture of vinyl acetate and methyl methacrylate, in equal proportions, is substituted for the methyl methacrylate monomer.

*Example 8.*—This is carried out as in Example 2 except that furfural is used in place of monomeric methyl methacrylate but in the same proportions.

*Example 9.*—The procedure of Example 2 is carried out but employing coumarin in place of the methyl methacrylate monomer but in the same proportions.

The above examples are merely intended to be illustrative of the present invention which broadly comprises treating the olefine-sulphone resin with one of the herein considered compounds to substantially neutralize or remove all residues of uncombined sulfur dioxide in the resin. The invention is applicable to treatment of the olefine-sulphone resins generally, regardless of the specific manner in which they are made, since these resins as heretofore made have been characterized by the presence of residues of uncombined sulfur dioxide.

The compounds having an olefinic bond and suitable for neutralizing the uncombined sulfur dioxide in the olefin-sulfone resins, include vinyl acetate, chloroprene, esters of acrylic acid, (e. g. methyl acrylate, butyl acrylate), esters of methacrylic acid, (e. g. methyl methacrylate, glycol methacrylate), coumarin and, in partially polymerized form, vinyl chloride.

It will be understood by those skilled in the art that the proportion of treating compound used in the treatment of specific olefine-sulphone resins will always be relatively minor but may be varied depending upon the amount of residues of sulfur dioxide present in the resin. To establish the exact amount needed for any particular resin, preliminary tests should be run. However, the treated resin is not injured even if a considerable excess of the treating is used. About 5%, by weight of the olefine-sulphone resin, of the treating compound can be used without affecting the physical properties of the resulting product to any great extent other than to make it stable to heat, while such proportion is easily sufficient to neutralize the residues of uncombined sulfur dioxide in any normally made olefine-sulphone resin.

The temperature to be employed during the neutralization influences the speed of reaction of the treating compound with the sulfur dioxide residue, the reaction being faster at high temperatures. In general, a temperature of 100° C. is high enough to bring about the desired reaction at a reasonable speed in practically every instance and much lower temperatures, i. e., 60° C. or even below, may be used. Temperatures above 100° C. are usually not desirable because of the volatility of the substances involved. The presence of solvent permits the reaction of the treating agent with the sulfur dioxide to go forward at practically feasible rates at lower temperatures than where the resins are treated in the absence of solvent.

While the principal benefit derived from the treatment of olefine-sulphone resins according to the present invention lies in the improvement of the resistance of the resins to heat, the removal of residues of uncombined sulfur dioxide also lessens the acidic character of the resins which, when the residual sulfur dioxide is still present, have a distinctly corrosive action upon metal such as that used in molds and also upon cellulosic fillers with which the resins may be mixed. Also, the stabilization treatment of the resins according to the present invention improves the resistance of the resins to water and, in particular, decreases or eliminates the tendency of the resins to chalk as a result of contact with boiling water.

The products of the interaction of the free sulfur dioxide with the treating agent are apparently compatible with the olefine-sulphone resin itself and not inimical to the quality of the resin. The products of the interaction are chiefly of resinous nature and either have no noticeable effect upon the properties of the olefine-sulphone resins or exert a mild and not objectionable plasticizing effect.

The present invention provides a sure and simple method of binding or neutralizing free residual sulfur dioxide in olefine-sulphone resins which has the practical beneficial effect of stabilizing the resins which show improved resistance to heat during molding operations and also improved chemical inertness so that the resins no longer exert a corrosive action upon metal. There is also a distinct improvement in resistance to water and especially boiling water. While, obviously, the treated product does contain the reaction product of the free sulfur dioxide and the treating agent used, it is essentially an olefine-sulphone resin and is characterized by its freeness from uncombined sulfur dioxide. Other than possibly a slight plasticizing action, the effect of the reaction product of the sulfur dioxide with the treating agent is substantially negligible.

As many apparently widely different embodiments of this invention may be made without departing from the spirit and scope thereof, it is to be understood that the invention is not limited to the specific embodiments thereof except as defined in the appended claims.

I claim:

1. Process of treating an olefine-sulphone resin containing uncombined residues of sulfur dioxide which comprises intimately admixing with the resin at an elevated temperature not in excess of 100° C. methyl methacrylate in such proportion as to react with substantially all of said uncombined residues of sulfur dioxide.

2. Process of treating an olefine-sulphone resin containing uncombined residues of sulfur dioxide which comprises intimately admixing with the resin at an elevated temperature not in excess of 100° C. coumarin in such proportion as to react with substantially all of said uncombined residues of sulfur dioxide.

3. Process of treating an olefine-sulphone resin containing uncombined residues of sulfur dioxide which comprises intimately admixing with the resin at an elevated temperature not in excess of 100° C. vinyl acetate in such proportion as to react with substantially all of said uncombined residues of sulfur dioxide.

4. In the manufacture of olefin-sulfone resins, the step comprising treating the resin at a temperature not in excess of 100° C. with a compound having an olefinic bond, said compound being selected from the group consisting of vinyl acetate, partially polymerized vinyl chloride, esters of acrylic and methacrylic acids, coumarin, furfural, and chloroprene.

5. Process of treating an olefin-sulfone resin containing uncombined residues of sulfur dioxide which comprises intimately admixing with the resin at an elevated temperature not in excess of 100° C. a compound having an olefinic bond, said compound being selected from the group consisting of vinyl acetate, partially polymerized vinyl chloride, esters of acrylic and methacrylic acids, coumarin, furfural, and chloroprene, in such proportions as to react with substantially all of said uncombined residues of sulfur dioxide.

6. Process of treating an olefin-sulfone resin containing uncombined residues of sulfur dioxide which comprises kneading the resin with about 5% of its weight of a compound having an olefinic bond, said compound being selected from the group consisting of vinyl acetate, partially polymerized vinyl chloride, esters of acrylic and methacrylic acids, coumarin, furfural, and chloroprene, the temperature of the resin being maintained below 100° C. during said kneading.

7. Process of treating an olefin-sulfone resin containing uncombined residues of sulfur dioxide which comprises intimately admixing with the resin in a liquid solvent medium and at an elevated temperature not in excess of 100° C. about 5% of the weight of the resin of a compound having an olefinic bond, said compound being selected from the group consisting of vinyl acetate, partially polymerized vinyl chloride, esters of acrylic and methacrylic acids, coumarin, furfural, and chloroprene.

8. A plastic composition comprising an olefin-sulfone resin substantially free of uncombined sulfur dioxide and containing a small proportion of the reaction product of sulfur dioxide and a compound having an olefinic bond, said compound being selected from the group consisting of vinyl acetate, partially polymerized vinyl chloride, esters of acrylic and methacrylic acids, coumarin, furfural, and chloroprene.

GEORGE H. WILDER.

CERTIFICATE OF CORRECTION.

Patent No. 2,146,276.  February 7, 1939.

GEORGE H. WILDER.

It is hereby certified that error appears in the printed specification of the above numbered patent requiring correction as follows: Page 2, first column, line 63, after the word "treating" insert agent; and that the said Letters Patent should be read with this correction therein that the same may conform to the record of the case in the Patent Office.

Signed and sealed this 14th day of March, A.D. 1939.

Henry Van Arsdale.

Acting Commissioner of Patents.

(Seal)

containing uncombined residues of sulfur dioxide which comprises intimately admixing with the resin at an elevated temperature not in excess of 100° C. vinyl acetate in such proportion as to react with substantially all of said uncombined residues of sulfur dioxide.

4. In the manufacture of olefin-sulfone resins, the step comprising treating the resin at a temperature not in excess of 100° C. with a compound having an olefinic bond, said compound being selected from the group consisting of vinyl acetate, partially polymerized vinyl chloride, esters of acrylic and methacrylic acids, coumarin, furfural, and chloroprene.

5. Process of treating an olefin-sulfone resin containing uncombined residues of sulfur dioxide which comprises intimately admixing with the resin at an elevated temperature not in excess of 100° C. a compound having an olefinic bond, said compound being selected from the group consisting of vinyl acetate, partially polymerized vinyl chloride, esters of acrylic and methacrylic acids, coumarin, furfural, and chloroprene, in such proportions as to react with substantially all of said uncombined residues of sulfur dioxide.

6. Process of treating an olefin-sulfone resin containing uncombined residues of sulfur dioxide which comprises kneading the resin with about 5% of its weight of a compound having an olefinic bond, said compound being selected from the group consisting of vinyl acetate, partially polymerized vinyl chloride, esters of acrylic and methacrylic acids, coumarin, furfural, and chloroprene, the temperature of the resin being maintained below 100° C. during said kneading.

7. Process of treating an olefin-sulfone resin containing uncombined residues of sulfur dioxide which comprises intimately admixing with the resin in a liquid solvent medium and at an elevated temperature not in excess of 100° C. about 5% of the weight of the resin of a compound having an olefinic bond, said compound being selected from the group consisting of vinyl acetate, partially polymerized vinyl chloride, esters of acrylic and methacrylic acids, coumarin, furfural, and chloroprene.

8. A plastic composition comprising an olefin-sulfone resin substantially free of uncombined sulfur dioxide and containing a small proportion of the reaction product of sulfur dioxide and a compound having an olefinic bond, said compound being selected from the group consisting of vinyl acetate, partially polymerized vinyl chloride, esters of acrylic and methacrylic acids, coumarin, furfural, and chloroprene.

GEORGE H. WILDER.

CERTIFICATE OF CORRECTION.

Patent No. 2,146,276.  February 7, 1939.

GEORGE H. WILDER.

It is hereby certified that error appears in the printed specification of the above numbered patent requiring correction as follows: Page 2, first column, line 63, after the word "treating" insert agent; and that the said Letters Patent should be read with this correction therein that the same may conform to the record of the case in the Patent Office.

Signed and sealed this 14th day of March, A.D. 1939.

Henry Van Arsdale.

Acting Commissioner of Patents.

(Seal)